United States Patent [19]

Willis et al.

[11] Patent Number: 5,158,064
[45] Date of Patent: Oct. 27, 1992

[54] STEAM DRYING ELEMENT FOR STEAM COOKING DEVICE

[76] Inventors: Thomas J. Willis, 34425 Lakeview Dr., Solon, Ohio 44139; James P. Bedford, 37527 Park Ave., Willoughby, Ohio 44094

[21] Appl. No.: 699,165

[22] Filed: May 13, 1991

[51] Int. Cl.⁵ ............................................. A21B 1/08
[52] U.S. Cl. ..................................... 126/20; 126/369; 126/348; 219/401
[58] Field of Search ............... 126/20, 20.1, 20.2, 126/369, 369.1, 369.2, 348, 350 B, 374; 219/401, 400; 392/394–401; 99/467, 468, 473, 474

[56] References Cited

U.S. PATENT DOCUMENTS 1,383,108 6/1921 Hadaway, Jr. ...................... 126/369
4,823,767 4/1989 Wust ..................................... 126/20

FOREIGN PATENT DOCUMENTS 1237897 6/1960 France ................................. 392/401
832247 5/1981 U.S.S.R. ............................. 392/401

Primary Examiner—James C. Yeung
Attorney, Agent, or Firm—Porter, Wright, Morris & Arthur

[57] ABSTRACT

A steam cooking device comprising a steam generating chamber having a steam generator, a cooking chamber adjacent to the steam generating chamber for receiving steam from the steam generator, a conduit for transporting the steam from the steam generating chamber to the cooking chamber and a heating element for heating the steam to a superheated condition prior to the steam entering the cooking chamber.

1 Claim, 3 Drawing Sheets

STEAM DRYING ELEMENT FOR STEAM COOKING DEVICE

BACKGROUND OF THE INVENTION

This invention relates to steam cooking devices, and particularly to arrangements for producing steam in steam cooking devices.

The advantages of steaming certain foods rather than cooking these foods by other methods have become well-recognized in recent years. For example, when meats are cooked under dry conditions, as when baked, the meat loses its intrinsic moisture and may become dried out and unpalatable. Further, vegetables contain certain valuable minerals which are retained if the vegetables are steamed rather than cooked by other means, such as boiling.

Current steam cooking devices utilize steam generated in a boiler to cook or thaw food. This boiler is adapted to contain water and the boiler contains a heating element to heat the water to produce steam. This steam is transported from the boiler to a cooking chamber where it is introduced into the cooking chamber by a conduit or the like to cook or thaw the food.

A problem with these steam cooking devices is that some of the steam condenses as it is being transported from the boiler to the cooking chamber. The steam will carry this condensate into the cooking compartment where it forms water on the floor of the cooking compartment and also on the food itself. This excess water in the cooking compartment slows the food cooking time and can also add excess moisture to the food products being heated.

SUMMARY OF THE INVENTION

The invention provides a steam cooking device comprising a steam generating chamber having a steam generator, a cooking chamber adjacent to the steam generating chamber for receiving steam from the steam generator, means for transporting the steam from the steam generating chamber to the cooking chamber and means for heating the steam to a superheated condition prior to the steam entering the cooking chamber.

The invention also provides a method for introducing steam into the cooking chamber of a steam cooking device comprising the steps of generating steam in a steam generating chamber, heating the steam to a superheated condition, transporting the superheated steam to the cooking chamber and injecting the superheated steam into the cooking chamber.

A principal feature of the invention is the means for heating the steam to a superheated condition prior to the steam entering the cooking chamber. This heating means can be located either in the steam generating chamber or outside of the steam generating chamber in the means for transporting the steam to the cooking chamber. Superheating the steam prior to the steam entering the cooking chamber will prevent some of the steam from condensing and thereby prevent excess moisture from forming on the floor of the cooking chamber and also from forming on the food in the cooking chamber.

Other principal features and advantages of the invention will become apparent to those skilled in the art upon review of the following detailed description, claims and drawings.

Figure 1:
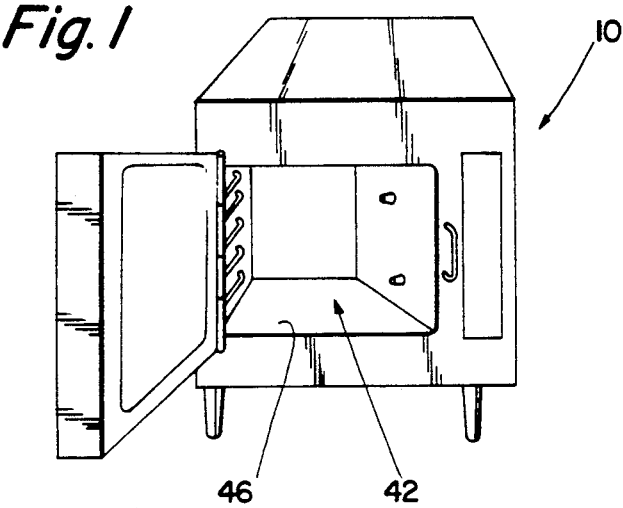
FIG. 1 is a front elevational view of a steam cooking device embodying the invention.
Figure 2:
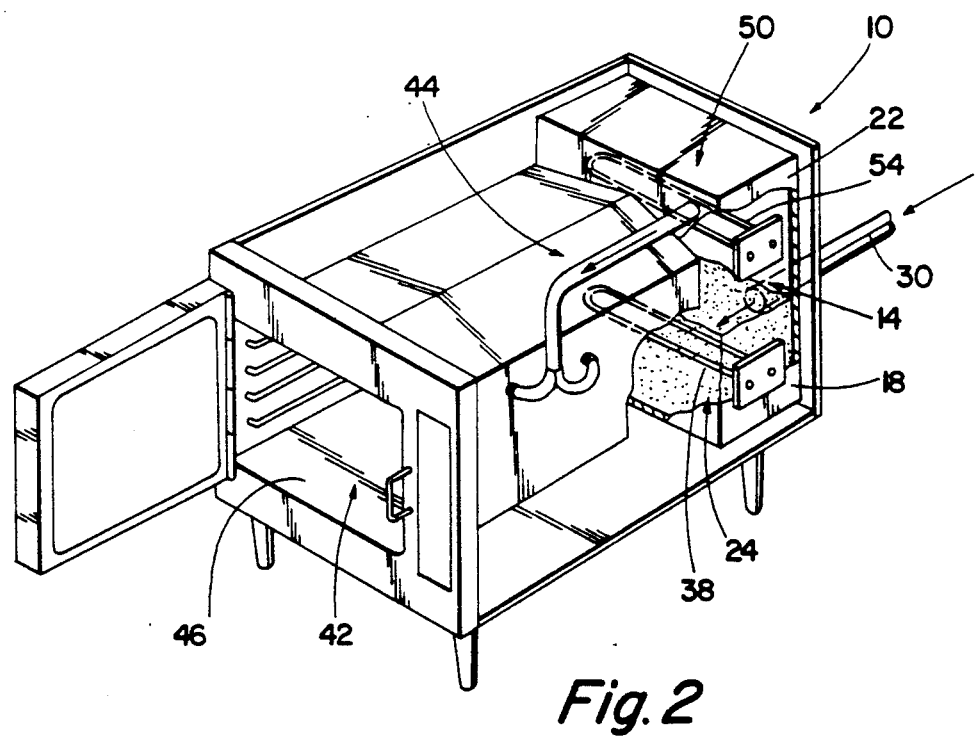
FIG. 2 is a side elevational view of a steam cooking device embodying the invention.
Figure 3:
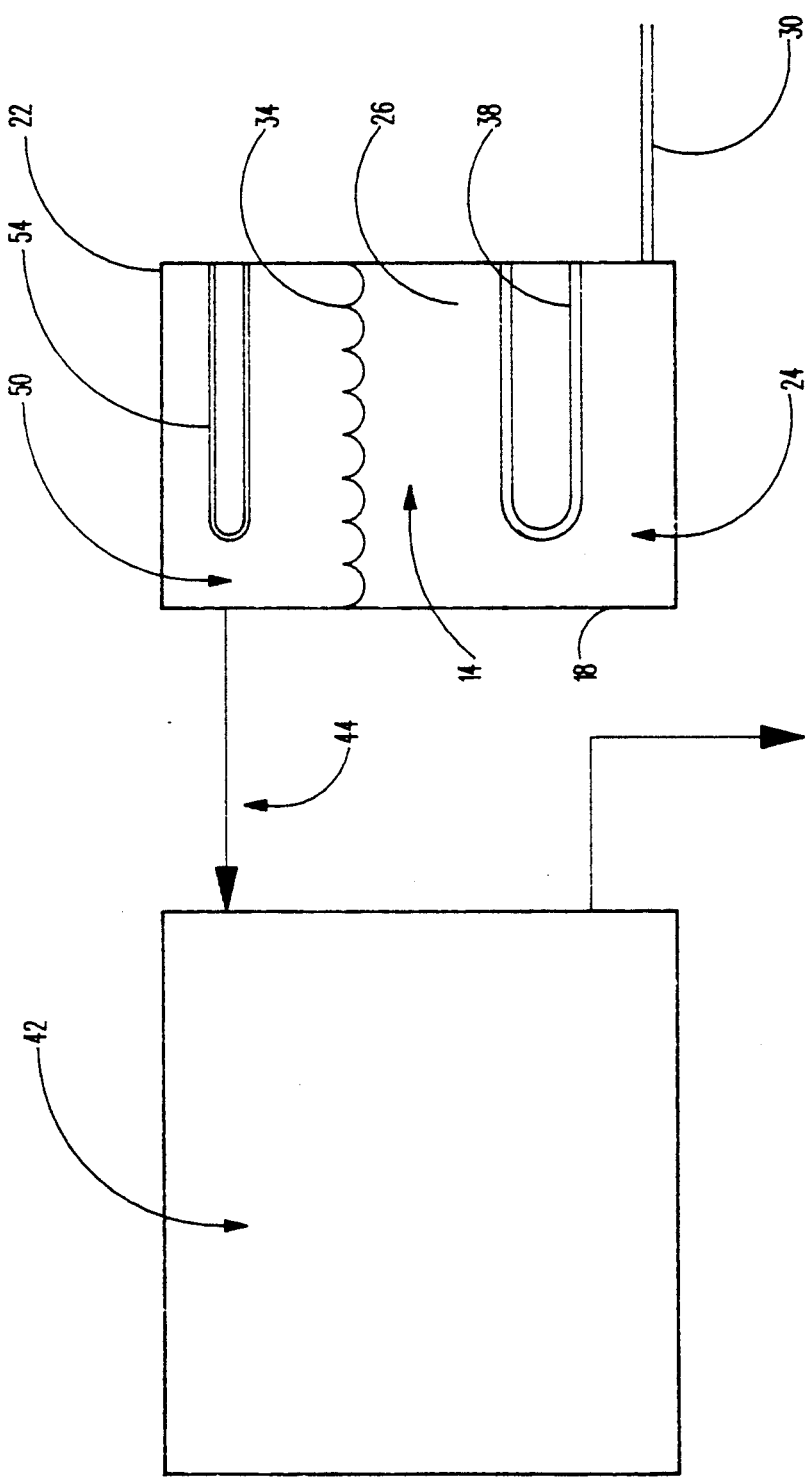
FIG. 3 is a schematic diagram illustrating the present invention.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it should be understood that the phraseology and terminology used herein is for the purpose of description and should not be regarded as limiting.

DESCRIPTION OF THE PREFERRED EMBODIMENT(S)

A steam cooking device 10 embodying the invention is illustrated in the drawings.

Before the invention is explained in detail, it should be understood that the means for heating the steam to a superheated condition can be utilized with almost any type of steam cooking device that injects steam into a cooking chamber, the operation of which is well-known in the art. Examples of the suitable steam cooking devices are the Steamcraft ® 3.1 Counter Type Convection Steamer and the Steamcraft ® 5.1 Counter Type Convection Steamer manufactured by Cleveland Range, Inc. in Cleveland, Ohio.

The steam cooking device 10 includes a steam generating chamber 14 having a lower portion 18 and an upper portion 22 and having a steam generator 24. The steam generator 24 is preferably an electric heated, non-pressurized boiler although the boiler can be gas heated and pressurized. Water 26 is introduced into the lower portion 18 of the steam generating chamber 14 through conduit 30. After the water 26 reaches a certain water level 34, the supply of water is turned off.

The steam cooking chamber 10 further includes a heating element 38 positioned in the lower portion 18 of the steam generating chamber 14 below the water level 34. Once the water 26 has reached the desired water level 34, the heating element 38 is activated to heat the water 26 to 212° F. to produce steam. In current steam cooking devices, the steam rises to the upper portion 22 of the steam generating chamber 14 where it is transported to the cooking chamber 42 of the steam cooking device 10. The means for transporting the steam to the cooking chamber 42 in the present invention are illustrated generally at 44. This transporting means 44 is typically a conduit or the like, although any suitable transporting means may be used. A problem with the current steam cooking devices is that some of the steam condenses as it is being transported to the cooking chamber 42 and the steam will carry this condensate into the cooking chamber 42 where it is either deposited on the floor 46 of the cooking chamber 42 or on the food which is in the cooking chamber 42. This excess water in the cooking chamber 42 slows the cooking time of the steam cooking device 10 and can add excess moisture to the food products being heated.

To solve this problem, the steam cooking device 10 of the present invention includes means 50 for heating the steam to a superheated condition prior to the steam entering the cooking chamber 42 of the steam cooking device 10. This heating means 50 preferably comprises a second heating element 54 positioned in the upper portion 22 of the steam generating chamber 14 above the water level 34.

In operation, heating element 38 will heat the water 26 in the steam generating chamber 14 to produce steam. This steam will rise to the upper portion 22 of the steam generating chamber 14 where it is heated to a superheated condition of around 220° F. by the second heating element 54. This superheated steam exits the steam generating chamber 14 where it is transported to the cooking chamber 42. This superheated steam will not condense as it is transported to the cooking chamber 42 and the steam can therefore be delivered "dry" to the cooking chamber 42. This will improve the cooking performance of the steam cooking device.

Figure 4:
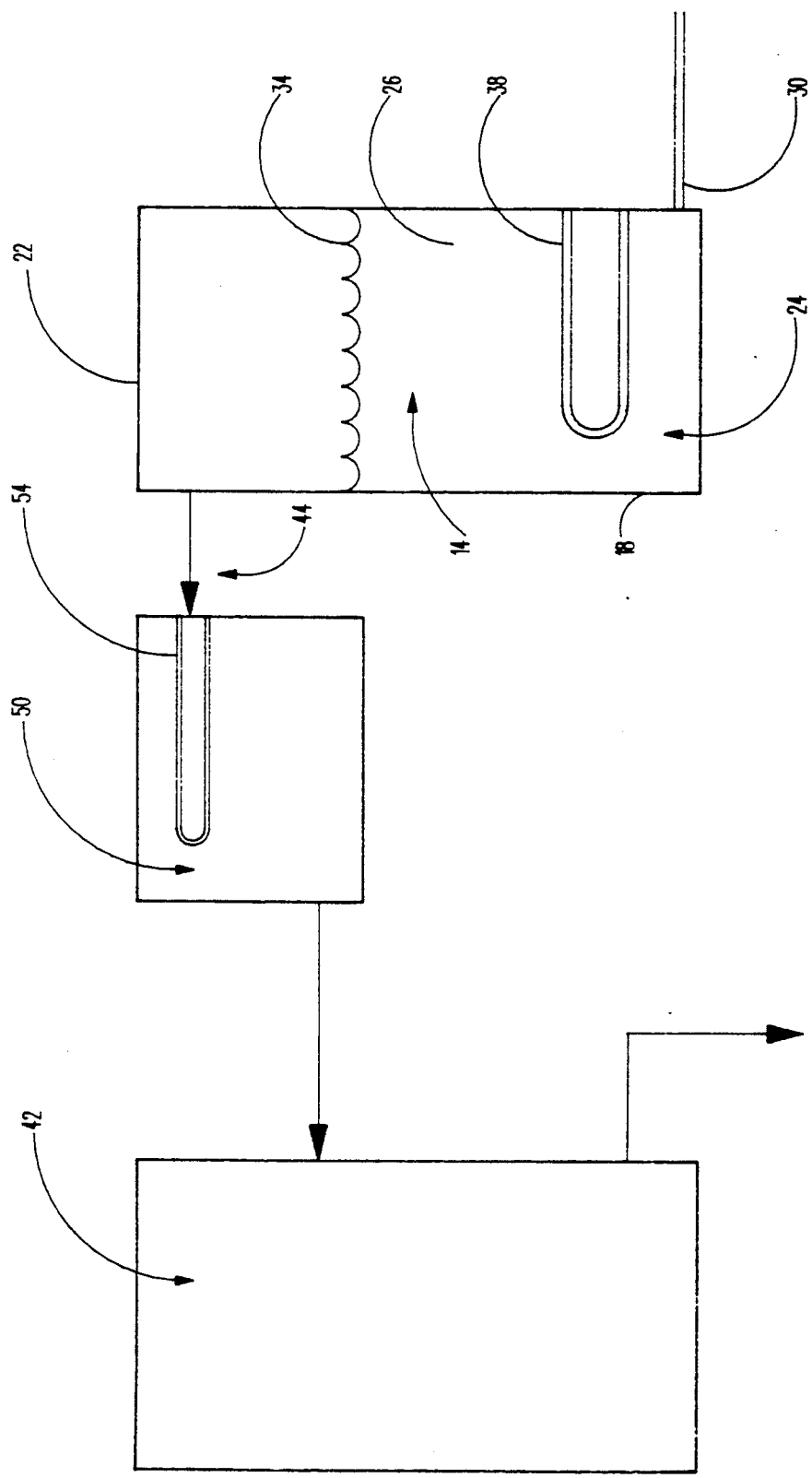
FIG. 4 is a schematic diagram illustrating an alternate embodiment of the present invention.

Although the second heating element 54 has been described as being located in the upper portion 22 of the steam generating chamber 14 above the water level 34, the second heating element 54 can be positioned anywhere beyond the water level 34 so as to heat the steam to a superheated condition prior to the steam entering the cooking chamber 42 of the steam cooking device 10. In FIG. 4, the second heating element 54 is positioned outside of the steam generating chamber 14 in the transporting means 44. Here, the steam will exit the steam generating chamber 14 and will be heated to a superheated condition in the transporting means 44 as it is being transported to the cooking chamber 42.

Various features of the invention are set forth in the following claims.

What is claimed is:

1. A steam cooking device comprising:
   a steam generating chamber adapted to contain water;
   a first heating element in said water and below the surface of said water for heating said water thereby generating steam;
   a second heating element positioned in said steam generating chamber, above the surface of said water, for generating superheated steam from said steam;
   a cooking chamber adjacent to said steam generating chamber for receiving said superheated steam; and
   means for transporting said superheated steam from said steam generating chamber to said cooking chamber.

* * * * *